United States Patent
Su et al.

(10) Patent No.: US 9,625,751 B2
(45) Date of Patent: Apr. 18, 2017

(54) TRANSPARENT DISPLAY AND METHOD FOR MANUFACTURING THE SAME

(71) Applicant: CHUNGHWA PICTURE TUBES, LTD., Padeh, Taoyuan (TW)

(72) Inventors: Chun-Wei Su, Taipei (TW); Jian-Hua Chen, Changhua County (TW)

(73) Assignee: CHUNGHWA PICTURE TUBES, LTD., Padeh, Taoyuan (TW)

( * ) Notice: Subject to any disclaimer, the term of this patent is extended or adjusted under 35 U.S.C. 154(b) by 264 days.

(21) Appl. No.: 14/230,434

(22) Filed: Mar. 31, 2014

(65) Prior Publication Data

US 2015/0185542 A1    Jul. 2, 2015

(30) Foreign Application Priority Data

Dec. 30, 2013 (TW) .............................. 102149000 A

(51) Int. Cl.
    *G02F 1/1333*     (2006.01)
    *G02F 1/1334*     (2006.01)

(52) U.S. Cl.
    CPC ...... *G02F 1/133365* (2013.01); *G02F 1/1334* (2013.01); *Y10T 29/49826* (2015.01)

(58) Field of Classification Search
    CPC ... G02F 1/1313; G02F 1/1334; G02F 1/13365
    See application file for complete search history.

(56) References Cited

U.S. PATENT DOCUMENTS

| 2010/0053527 | A1 | 3/2010 | Hsieh et al. | |
|---|---|---|---|---|
| 2013/0271713 | A1* | 10/2013 | Miyake | C09K 19/0225 349/124 |
| 2013/0314620 | A1* | 11/2013 | Ebisui | G02F 1/1313 349/1 |
| 2014/0104521 | A1* | 4/2014 | Nishimura | G02F 1/13306 349/33 |
| 2014/0333879 | A1* | 11/2014 | Noma | C09K 19/12 349/124 |

FOREIGN PATENT DOCUMENTS

TW       I397742 B1    6/2013

\* cited by examiner

*Primary Examiner* — Mathieu Vargot
(74) *Attorney, Agent, or Firm* — Muncy, Geissler, Olds & Lowe, P.C.

(57) ABSTRACT

A transparent display includes a first substrate, a second substrate, a liquid crystal molecule layer, a first liquid crystal cell layer, a second liquid crystal cell layer and a thermal reaction type high polymer film. The second substrate is disposed opposed to the first substrate. The liquid crystal molecule layer has a plurality of liquid crystal molecules and is disposed between the first substrate and the second substrate. The first liquid crystal cell layer has a plurality of first liquid crystal cells and is disposed between the first substrate and the liquid crystal molecule layer. The second liquid crystal cell layer has a plurality of second liquid crystal cells and is disposed between the liquid crystal molecule layer and the second substrate. The thermal reaction type high polymer film is disposed between the second liquid crystal cell layer and the second substrate.

6 Claims, 7 Drawing Sheets

TRANSPARENT DISPLAY AND METHOD FOR MANUFACTURING THE SAME

CROSS-REFERENCE TO RELATED APPLICATION

This application claims the benefit of Taiwan Patent Application No. 102149000, filed on Dec. 30, 2013, which is hereby incorporated by reference for all purposes as if fully set forth herein.

BACKGROUND

Technical Field

The present invention relates to a transparent display and a method for manufacturing the same, and in particular to a transparent display and a method for manufacturing the same, wherein the transparent display includes two liquid crystal cell layers.

Related Art

FIGS. 1a and 1b are schematic cross-sectional views of a transparent display in the prior art. The conventional transparent display 900 includes an upper substrate 910 and a lower substrate 920, a liquid crystal layer 930 and a liquid crystal cell layer 940. The lower substrate 920 is a thin film transistor (TFT) substrate. The lower substrate 920 includes a pixel electrode 921, which is made of transparent conductive material. The upper substrate 910 is disposed opposed to the lower substrate 920. The upper substrate 910 includes a color filter layer 911 and a common electrode 912. The liquid crystal layer 930 is disposed between the lower substrate 920 and the upper substrate 910. The liquid crystal cell layer 940 is formed between the lower substrate 920 and the liquid crystal layer 930.

Referring to FIG. 1a, the polymerization between a part of UV reaction type liquid crystal molecules and polymer monomers is generated by using an UV light beam 950 to emit the liquid crystal layer 930 in the direction of the lower substrate 920, whereby the U quid crystal cell layer 940 is only formed on one side of the lower substrate 920. When the liquid crystal cell layer 940 is formed, the liquid crystal cell layer 940 can stop the UV light beam 950 from continuously emitting the liquid crystal layer 930. Thus, the polymerization between the other part of UV reaction type liquid crystal molecules and polymer monomers cannot be generated continuously. In addition, the UV light beam 950 cannot emit the liquid crystal layer 930 in the direction of the upper substrate 910, because the color filter layer 911 will stop the wavelength and energy of the light beam. Thus, the liquid crystal layer 930 cannot be effectively formed with a liquid crystal cell layer located on one side of the upper substrate 910.

Referring to FIG. 1b, the liquid crystal cell layer 940 has better scattering state, when the conventional transparent display is not energized by a voltage, and optic axes of the liquid crystal cell layer 940 intersect an incident ambient light 960. However, since the liquid crystal cell layer 940 is only formed on one side of the lower substrate 920 in the conventional transparent display, a part of the incident ambient light 960 is reflected to be a scattered reflecting light 961 by the liquid crystal cell layer 940, and another part of the incident ambient light 960 penetrates through the lower substrate 920 and become a scattered transparent light 962. Thus, a part of area of a displaying screen of the transparent display 900 shows being cream, i.e., the contrast of the conventional transparent display is not good. Accordingly, the conventional transparent display cannot have high contrast of the displaying screen.

Therefore, it is required to provide a transparent display and a method for manufacturing the same, wherein the transparent display has high contrast and is capable of solving the forgoing problems.

SUMMARY

Accordingly, the objective of the present invention is to provide a transparent display and a method for manufacturing the same, wherein the transparent display includes two liquid crystal cell layers.

To achieve the objective, the present invention provides a transparent display, including: a first substrate; a second substrate disposed opposed to the first substrate; a liquid crystal molecule layer having a plurality of liquid crystal molecules and disposed between the first substrate and the second substrate; a first liquid crystal cell layer having a plurality of first liquid crystal cells and disposed between the first substrate and the liquid crystal molecule layer, wherein the first liquid crystal cell includes a liquid crystal molecule and a polymer monomer; a second liquid crystal cell layer having a plurality of second liquid crystal cells and disposed between the liquid crystal molecule layer and the second substrate, wherein the second liquid crystal cell includes a liquid crystal molecule and a polymer monomer; and a thermal reaction type high polymer film disposed between the second liquid crystal cell layer and the second substrate.

To achieve the objective, the present invention further provides a method for manufacturing a transparent display, including the following steps of: providing a first substrate; providing a second substrate; forming a thermal reaction type high polymer film on a surface of the second substrate; combining the first substrate and the second substrate, whereby the thermal reaction type high polymer film is located between the first substrate and the second substrate; filling a high polymer liquid crystal layer between the first substrate and the thermal reaction type high polymer film; and emitting the high polymer liquid crystal layer by an external light beam in the direction of the first substrate, and simultaneously heating the high polymer liquid crystal layer in the direction of the second substrate, whereby a polymerization is generated at a part of the high polymer liquid crystal layer, the part of the high polymer liquid crystal layer is formed to a first liquid crystal cell layer located on a surface of the first substrate, the polymerization is generated at another part of the high polymer liquid crystal layer, and the another part of the high polymer liquid crystal layer is formed to a second liquid crystal cell layer located on a surface of the thermal reaction type high polymer film.

According to the transparent display of the present invention and the method for manufacturing the same, the high polymer liquid crystal layer is emitted by the external light beam and heated simultaneously, and thus both liquid crystal cell layers are formed at two sides. However, the conventional transparent display includes only one liquid crystal cell layers is formed at one side. Compared with the conventional transparent display, the transparent display by the method of the present invention can have improved scattering state of liquid crystals and better contrast of the transparent display. In addition, the present invention doesn't need alignment films and polarization plates, and thus the transparent display of the present invention has simple manufacture process, high yield rate and lower manufacture cost.

In order to make the aforementioned and other objectives and advantages of the present invention comprehensible, embodiments accompanied with figures are described in detail below.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Figure 1A:
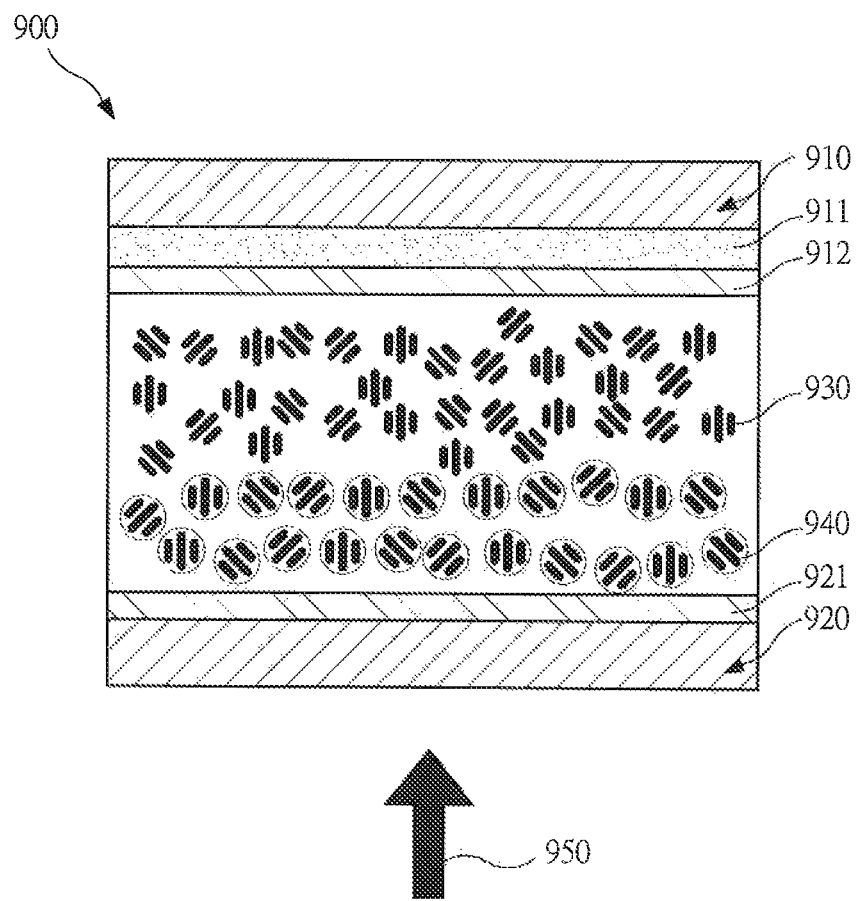
FIGS. 1a and 1b are schematic cross-sectional views of a transparent display in the prior art.
Figure 1B:
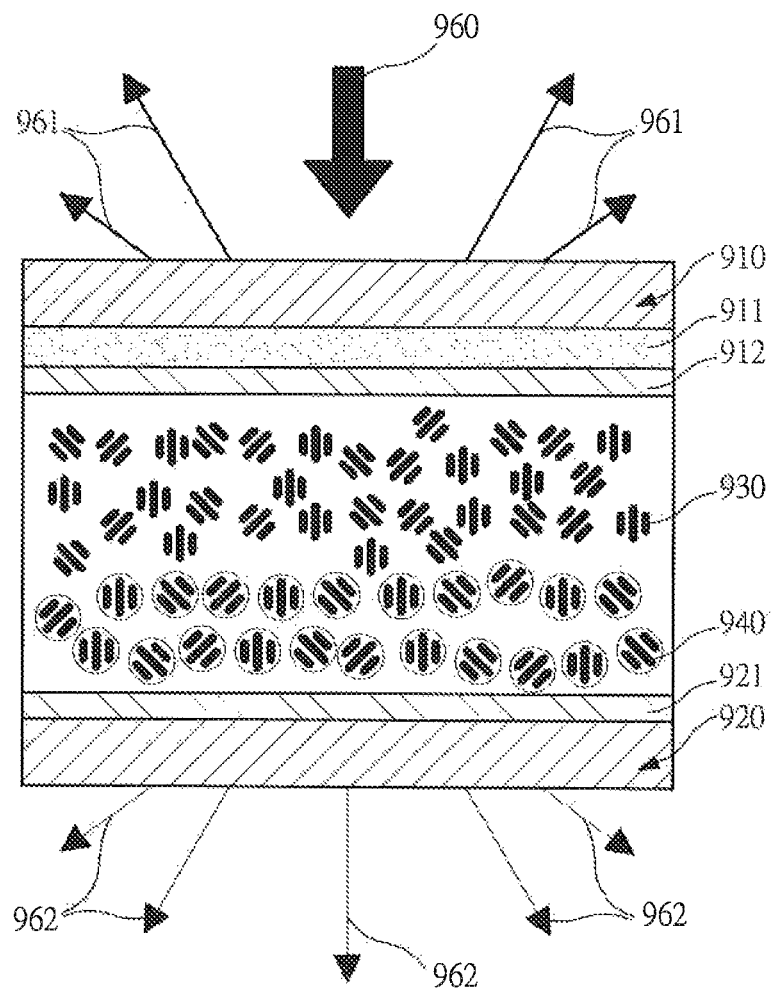
Figure 2:
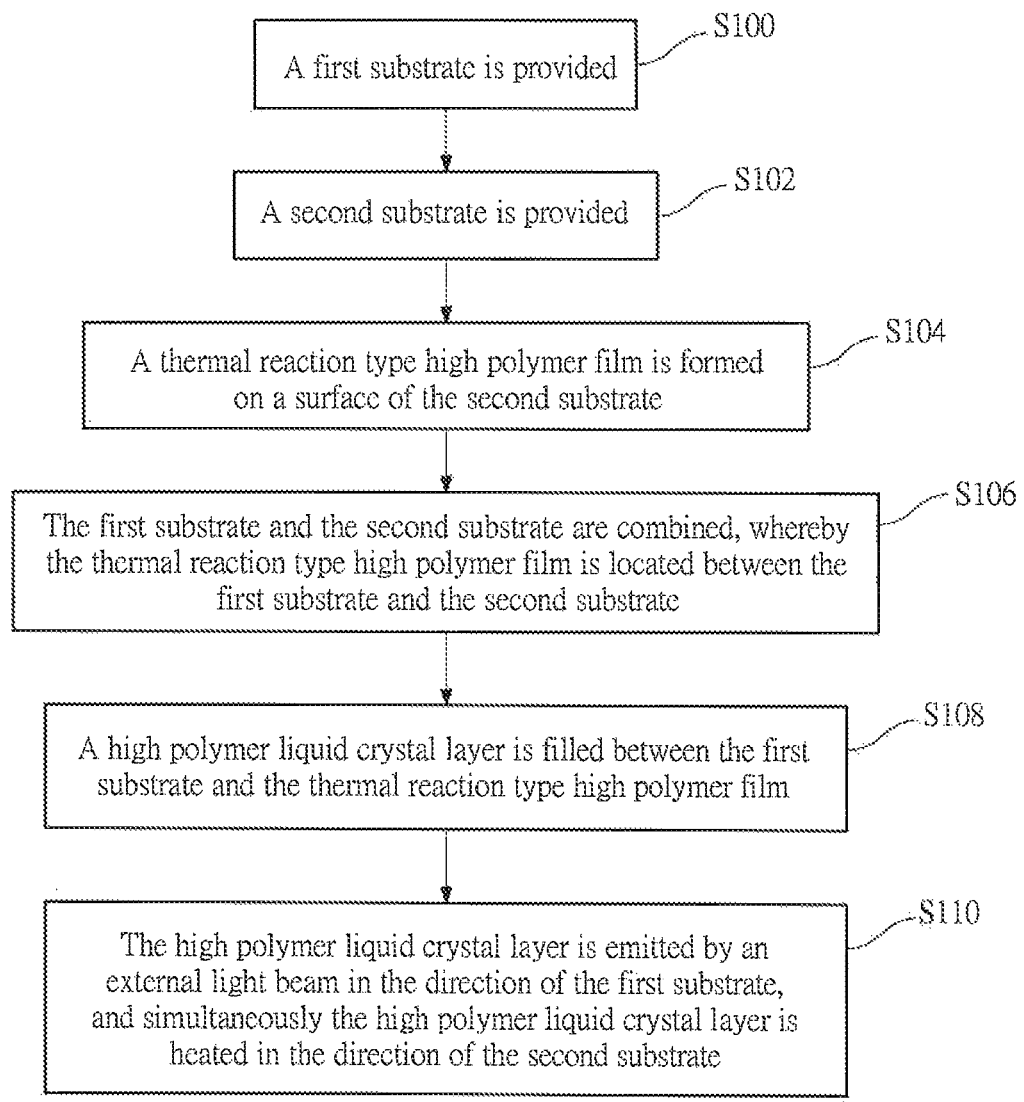
FIG. 2 is a flow chart of a method for manufacturing a transparent display according to an embodiment of the present invention.
Figure 3A:
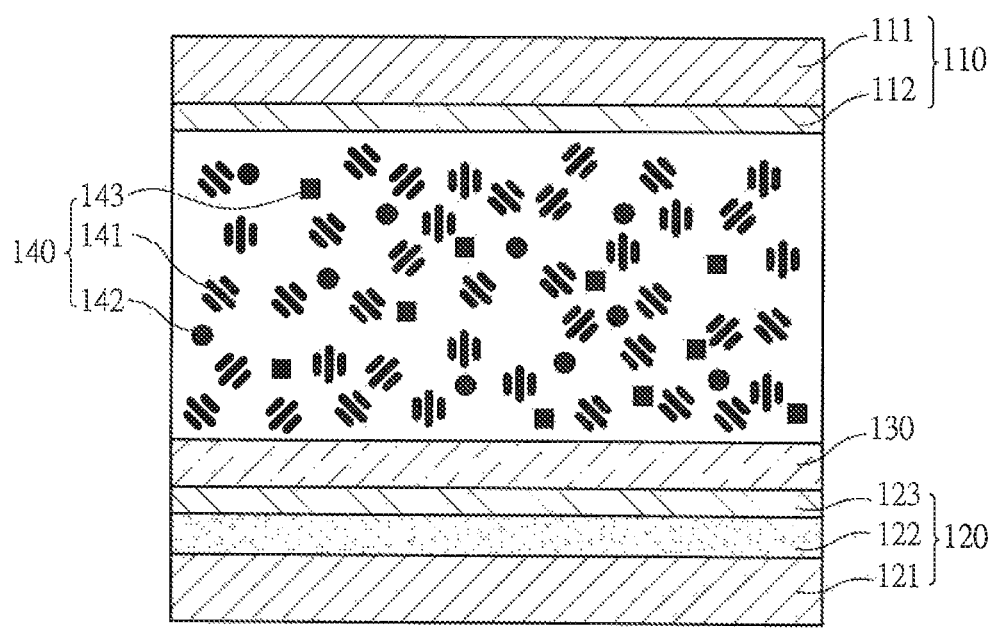
FIG. 3a to FIG. 3c are schematic cross-sectional views showing a method for manufacturing a transparent display according to an embodiment of the present invention.

FIG. 2 is a flow chart of a method for manufacturing a transparent display according to an embodiment of the present invention. The method includes steps as follows:

Step S100: a first substrate is provided. Referring to FIG. 3a, in this step, the first substrate 110 can be a thin film transistor substrate. The first substrate 110 can include a transparent substrate 111, a plurality of thin film transistors (not shown) and a plurality of pixel electrodes 112 which are electrically connected to the thin film transistors. The pixel electrodes 112 can be made of transparent conductive material, e.g., indium tin oxide, indium zinc oxide, aluminum tin oxide, aluminum zinc oxide, indium germanium zinc oxide or other suitable oxides or a stacking layer including at least two above-mentioned materials, but not intended to limit the present invention.

Step S102: a second substrate is provided. In this step, the second substrate 120 includes a transparent substrate 121, a transparent conductive layer 123 and a color filter layer 122. The color filter layer 122 is formed between the transparent substrate 121 and the transparent conductive layer 123.

Step S104: a high polymer film (i.e., thermal reaction type high polymer film) is formed on a surface of the second substrate. In this step, the thermal reaction type high polymer film 130 is made of polyvinylcarbazole (PVK), hydroxyethyl methacrylate (HEMA) or dipentaerythritol hexa-acrylate (DPHA).

The formula of polyvinylcarbazole (PVK) is:

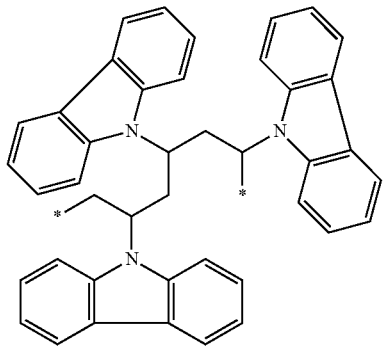 [SMILES: *CC(CC(CC(*)n1c2ccccc2c2ccccc21)n1c2ccccc2c2ccccc21)n1c2ccccc2c2ccccc21]

The formula of hydroxyethyl methacrylate (HEMA) is:

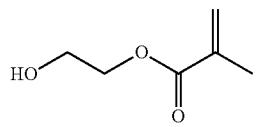

The formula of dipentaerythritol hexa-acrylate (DPHA) is:

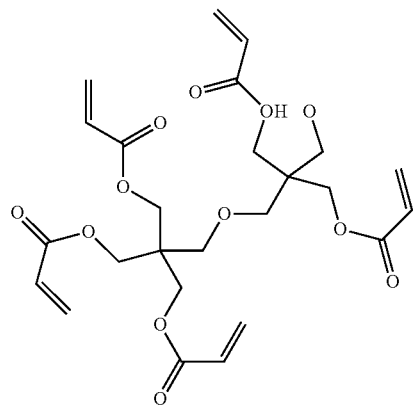 [SMILES: C=CC(=O)OCC(CO)(COCC(COC(=O)C=C)(COC(=O)C=C)COC(=O)C=C)COC(=O)C=C]

Step S106: the first substrate and the second substrate are combined, whereby the thermal reaction type high polymer film is located between the first substrate and the second substrate. In this step, a sealant (not shown) is first coated on the first substrate 110. Then, the second substrate 120 is aligned with the first substrate 110. Then, the second substrate 120 is bonded to the first substrate 110 by the sealant. Finally, the sealant is solidified, whereby the combination of the first substrate 110 and the second. substrate 120 is finished.

Step S108: a high polymer liquid crystal layer is filled between the first substrate and the thermal reaction type high polymer film. In this step, the high polymer liquid crystal layer 140 includes a plurality of liquid crystal molecules 141, high polymer monomers 142 and photo-initiators 143. The high polymer monomer 142 includes polyol acrylate oligomer and difunctional acrylate monomer. The high polymer liquid crystal layer 140 is filled between the first substrate 110 and the thermal reaction type high polymer film 130 by a vacuum injection manner, but not intended to limit the present invention. In other embodiment, the high polymer liquid crystal layer 140 can be filled between the first substrate 110 and the thermal reaction type high polymer film 130 by one drip fill (ODF) manner or suitable manner. The photo-initiator 143 can be an UV photo-initiator.

Figure 3B:
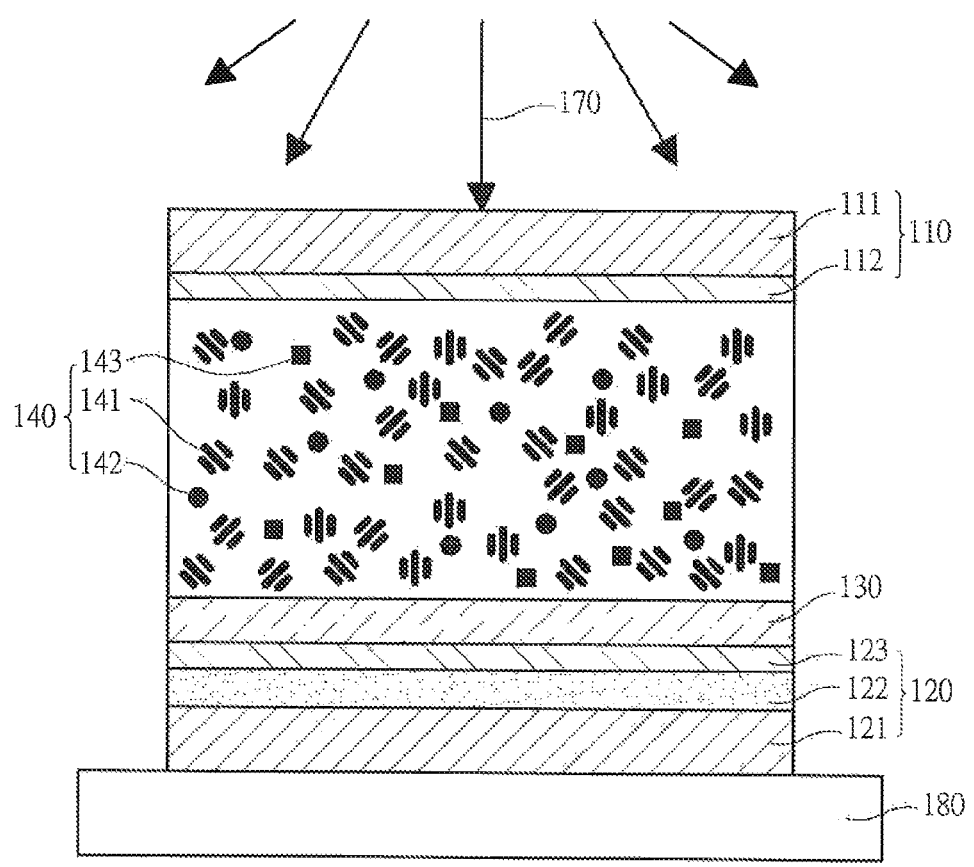
Figure 3C:
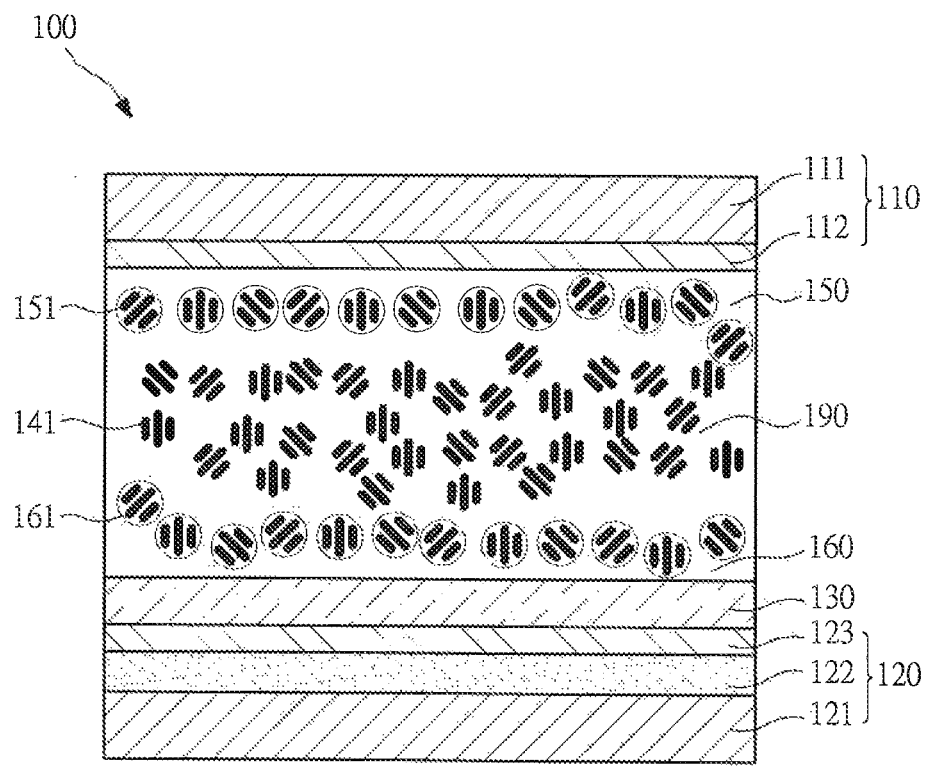

Step S110: the high polymer liquid crystal layer 140 is emitted by an external light beam in the direction of the first substrate 110, and simultaneously the high polymer liquid crystal layer 140 is heated in the direction of the second substrate 120. Referring to FIGS. 3b and 3c, in this step, the high polymer liquid crystal layer 140 is emitted by the external light beam 170 in the direction of the first substrate 110, whereby the polymerization is generated at a part of the high polymer liquid crystal layer 140, which is formed to a first liquid crystal cell layer 150 (shown in FIG. 3c). More detailed, some liquid crystal molecules 141 are formed to a plurality of first liquid crystal cells 151 located on a surface of the first substrate 110 by the polyol acrylate oligomers, and then the liquid crystal molecules 141 of the first liquid crystal cells 151 and the polyol acrylate oligomers are polymerized effectively by the difunctional acrylate monomer, such that the first liquid crystal cells 151 are formed to the first liquid crystal cell layer 150. In this embodiment, the external light beam 170 can be an UV light beam.

When the high polymer liquid crystal layer 140 is emitted by the external light beam 170, simultaneously the high polymer liquid crystal layer 140 is heated in the direction of the second substrate 120, whereby the polymerization is generated at another part of the high polymer liquid crystal layer 140. In this step, the transparent display 100 is put on a heating platform 180, and the second substrate 120 contacts the heating platform 180. The heat energy is transferred to the high polymer liquid crystal layer 140 by the heating platform 180. After the high polymer liquid crystal layer 140 is heated, the polymerization is generated between the another part of the high polymer liquid crystal layer 140 and the thermal reaction type high polymer film 130, whereby a plurality of second liquid crystal cells 161 are formed on a surface of the thermal reaction type high polymer film 130, such that the second liquid crystal cells 161 are formed to a second liquid crystal cell layer 160. The heating temperature is 60 degrees centigrade, and the heating time persists for 5 minutes.

In additional, the rest of the high polymer liquid crystal layer 140 which is not polymerized is formed to a liquid crystal molecule layer 190, which is located between the first liquid crystal cell layer 150 and the second liquid crystal cell layer 160.

Figure 4:
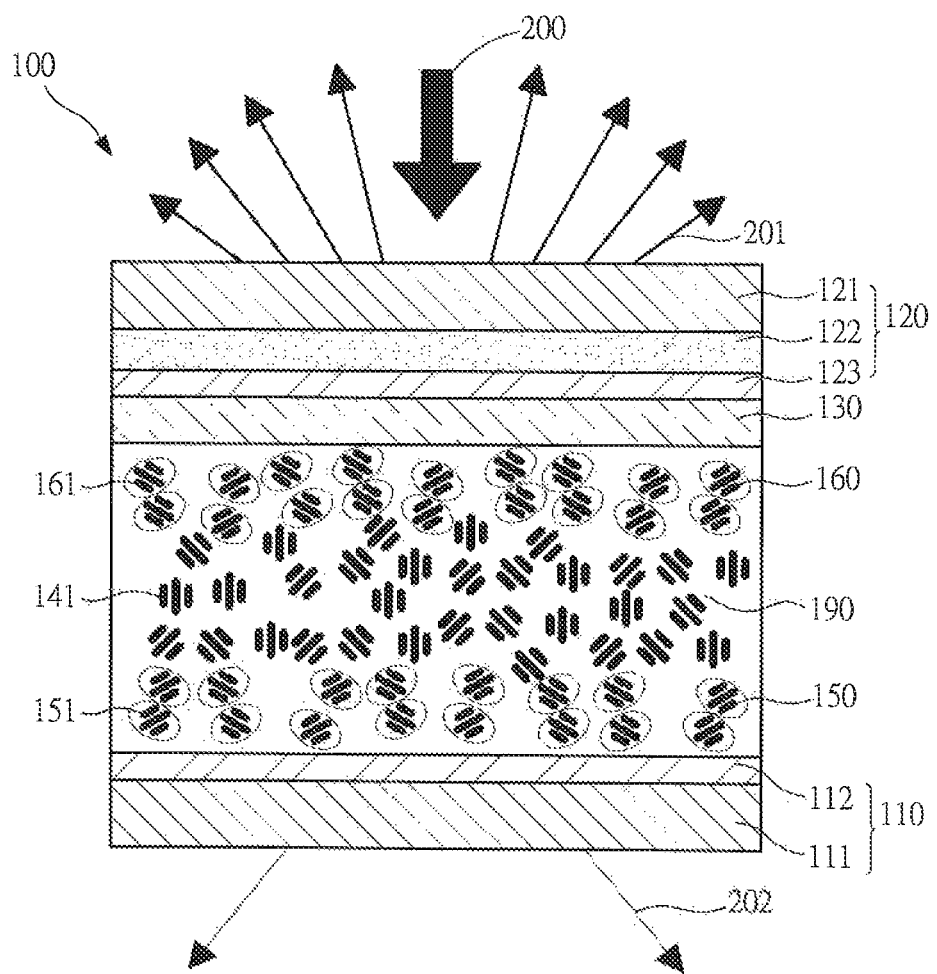
FIG. 4 is schematic cross-sectional view of a transparent display according to an embodiment of the present invention.

FIG. 4 is a schematic cross-sectional view of a transparent display according to an embodiment of the present invention. The transparent display 100 is manufactured by steps shown in FIG. 2. The transparent display 100 includes a first substrate 110, a second substrate 120, a liquid crystal molecule layer 190, a first liquid crystal cell layer 150, a second liquid crystal cell layer 160 and a thermal reaction type high polymer film 130. The second substrate 120 is disposed opposed to the first substrate 110. The liquid crystal molecule layer 190 has a plurality of liquid crystal molecules 141 and is disposed between the first substrate 110 and the second substrate 120. The first liquid crystal cell layer 150 has a plurality of first liquid crystal cells 151 and is disposed between the first substrate 110 and the liquid crystal molecule layer 190, wherein the first liquid crystal cell 151 includes a liquid crystal molecule and a high polymer monomer. The second liquid crystal cell layer 160 has a plurality of second liquid crystal cells 161 and is disposed between the liquid crystal molecule layer 190 and the second substrate 120, wherein the second liquid crystal cell 161 includes another liquid crystal molecule and another high polymer monomer. The thermal reaction type high polymer film 130 is disposed between the second liquid crystal cell layer 160 and the second substrate 120.

The first substrate 110 can be a thin film transistor substrate, which includes a plurality of thin film transistors (not shown) and a plurality of pixel electrodes 112. The pixel electrodes 112 are electrically connected to the thin film transistors. The second substrate 120 includes a transparent substrate 121, a transparent conductive layer 123 and a color filter layer 122. The color filter layer 122 is formed between the transparent substrate 121 and the transparent conductive layer 123. The first liquid crystal cell layer 150 and the second liquid crystal cell layer 160 are formed by some liquid crystal molecule 141 and high polymer monomer 142 (shown in FIG. 3a). The high polymer monomer 142 includes polyol acrylate oligomer and difunctional acrylate monomer. The thermal reaction type high polymer film 130 is made of polyvinylcarbazole (PVK), hydroxyethyl methacrylate (HEMA) or dipentaerythritol hexa-acrylate (DPHA).

The first liquid crystal cell layer 150 and the second liquid crystal cell layer 160 have better scattering state, when a gap between the first substrate 110 and the second substrate 120 of the transparent display 100 is not energized by a voltage, and optic axes of the first liquid crystal cell layer 150 and the second liquid crystal cell layer 160 intersect an ambient light 200. When the transparent display 100 is emitted by the ambient light 200, most part of the ambient light 200 is reflected to be a scattered reflecting light 201 by the first liquid crystal cell layer 150 and the second liquid crystal cell layer 160 respectively, and only little part of the ambient light 200 can penetrate through the transparent display 100 and become a scattered transparent light 202. Thus, a part of area of a displaying screen of the transparent display 100 shows being white, i.e., the transparent display of the present invention can have high contrast of the displaying screen.

According to the transparent display of the present invention and the method for manufacturing the same, the high polymer liquid crystal layer is emitted by the external light beam and heated simultaneously, and thus both liquid crystal cell layers are formed at two sides. However, the conventional transparent display includes only one liquid crystal cell layers is formed at one side. Compared with the conventional transparent display, the transparent display by the method of the present invention can have improved scattering state of liquid crystals and better contrast of the transparent display. In addition, the present invention doesn't need alignment films and polarization plates, and thus the transparent display of the present invention has simple manufacture process, high yield rate and lower manufacture cost.

In conclusion, described in the foregoing are merely implementation manners or embodiments for presenting the technical means employed in the present invention for solving the problems, and these implementation manners or embodiments are not intended to limit the implementation scope of the present invention. Any equivalent change and modification made in consistency with the content of the scope of the present invention of the patent application or in accordance with the scope of the present invention shall fall within the scope of the present invention.

What is claimed is:

1. A method for manufacturing a transparent display, comprising the following steps of:
   providing a first substrate;
   providing a second substrate;
   forming a high polymer film on a surface of the second substrate;
   combining the first substrate and the second substrate, whereby the high polymer film is located between the first substrate and the second substrate;
   filling a high polymer liquid crystal layer between the first substrate and the high polymer film; and
   emitting the high polymer liquid crystal layer by an external light beam in the direction of the first substrate, and simultaneously heating the high polymer liquid crystal layer in the direction of the second substrate, whereby a polymerization is generated at a part of the high polymer liquid crystal layer, the part of the high polymer liquid crystal layer is formed to a first liquid crystal cell layer located on a surface of the first substrate, the polymerization is generated at another part of the high polymer liquid crystal layer, and the another part of the high polymer liquid crystal layer is formed to a second liquid crystal cell layer located on a surface of the high polymer film.

2. The method according to claim 1, wherein the high polymer film is made of polyvinylcarbazole (PVK), hydroxyethyl methacrylate (HEMA) or dipentaerythritol hexa-acrylate (DPHA).

3. The method according to claim 1, wherein the high polymer liquid crystal layer includes a plurality of liquid crystal molecules, high polymer monomers and photo-initiators.

4. The method according to claim 3, wherein the photo-initiator is an UV photo-initiator, and the external light beam is an UV light beam.

5. The method according to claim 1, wherein the first substrate is a thin film transistor substrate, and the second substrate includes a color filter layer.

6. The method according to claim 3, wherein the high polymer monomers include polyol acrylate oligomer and difunctional acrylate monomer.

\* \* \* \* \*